(12) United States Patent
Choi et al.

(10) Patent No.: US 11,643,337 B2
(45) Date of Patent: May 9, 2023

(54) LITHIUM COMPOSITE OXIDE, POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Hyun Jong Yu, Cheongju-si (KR); Seung Hyun Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 31 days.

(21) Appl. No.: 17/354,931

(22) Filed: Jun. 22, 2021

(65) Prior Publication Data

US 2021/0309537 A1  Oct. 7, 2021

Related U.S. Application Data

(62) Division of application No. 16/537,469, filed on Aug. 9, 2019, now Pat. No. 11,078,089.

(30) Foreign Application Priority Data

| Aug. 22, 2018 | (KR) | 10-2018-0098186 |
| Sep. 18, 2018 | (KR) | 10-2018-0111347 |
| Apr. 19, 2019 | (KR) | 10-2019-0046060 |
| May 24, 2019 | (KR) | 10-2019-0061433 |

(51) Int. Cl.
*H01M 4/131* (2010.01)
*C01G 53/00* (2006.01)
*H01M 10/0525* (2010.01)
*H01M 4/02* (2006.01)

(52) U.S. Cl.
CPC ............ *C01G 53/42* (2013.01); *H01M 4/131* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2018/0233739 A1* 8/2018 Park ...................... H01M 4/525

FOREIGN PATENT DOCUMENTS

| EP | 3 282 506 A1 | 2/2018 |
| EP | 3 331 067 A1 | 6/2018 |
| JP | 2018-502421 A | 1/2018 |
| JP | 2018-532236 A | 11/2018 |
| KR | 10-2013-0055654 A | 5/2013 |

(Continued)

OTHER PUBLICATIONS

The extended European search report issued by the European Patent Office dated Jan. 30, 2020, which corresponds to European Patent Application No. 19190947.2-1106 and is related to U.S. Appl. No. 16/537,469.

*Primary Examiner* — Wyatt P McConnell
(74) *Attorney, Agent, or Firm* — Studebaker & Brackett PC

(57) ABSTRACT

The present invention relates to a lithium composite oxide, a positive electrode active material for a lithium secondary battery including the lithium composite oxide, and a lithium secondary battery using a positive electrode including the positive electrode active material.

9 Claims, 13 Drawing Sheets

(56) References Cited

FOREIGN PATENT DOCUMENTS

| | | |
|---|---|---|
| KR | 10-2013-0108717 A | 10/2013 |
| KR | 10-2013-0117340 A | 10/2013 |
| KR | 10-2014-0022681 A | 2/2014 |
| KR | 10-2017-0063395 A | 6/2017 |
| KR | 10-2017-0063396 A | 6/2017 |
| KR | 10-2017-0063407 A | 6/2017 |
| KR | 10-2017-0075654 A | 7/2017 |
| KR | 10-2018-0057864 A | 5/2018 |
| WO | 2015/163356 A1 | 10/2015 |

\* cited by examiner

LITHIUM COMPOSITE OXIDE, POSITIVE ELECTRODE ACTIVE MATERIAL AND LITHIUM SECONDARY BATTERY COMPRISING THE SAME

CROSS-REFERENCE TO RELATED APPLICATION

This application is a Divisional of U.S. patent application Ser. No. 16/537,469 filed Aug. 9, 2019, which claims priority to and the benefit of Korean Patent Application No. 10-2018-0098186, filed on Aug. 22, 2018, Korean Patent Application No. 10-2018-0111347, filed on Sep. 18, 2018, Korean Patent Application No. 10-2019-0046060, filed on Apr. 19, 2019, and Korean Patent Application No. 10-2019-0061433, filed on May 24, 2019, the disclosure of which are incorporated herein by reference in their entirety.

BACKGROUND

1. Field of the Invention

The present invention relates to a lithium composite oxide, a positive electrode active material for a lithium secondary battery, which includes the lithium composite oxide, and a lithium secondary battery comprising a positive electrode including the positive electrode active material.

2. Discussion of Related Art

Batteries store electrical power by using materials facilitating an electrochemical reaction with a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, while $LiCoO_2$ is most widely used due to excellent lifespan characteristics and charge/discharge efficiency, it is expensive because of the resource limit of cobalt used as a raw material, and has a disadvantage that price competitiveness is limited.

Lithium manganese oxides such as $LiMnO_2$, $LiMn_2O_4$, etc. have advantages of excellent thermal safety and low costs, but also have problems of small capacity and poor high-temperature characteristics. In addition, while a $LiNiO_2$-based positive electrode active material exhibits a battery characteristic of high discharge capacity, due to cation mixing between Li and a transition metal, it is difficult to synthesize the $LiNiO_2$-based positive electrode active material, thereby causing a greater problem in rate characteristic.

In addition, depending on the intensification of such cation mixing, a large amount of Li by-products is generated, and since most of the Li by-products consist of a compound of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

SUMMARY OF THE INVENTION

To solve the problems of a conventional lithium composite oxide for positive electrode active material for a lithium secondary battery, the present invention is directed to providing a lithium composite oxide which is improved in structural stability due to a concentration gradient of a doping metal element included in primary particles, which decreases toward the center of a secondary particle.

The present invention is also directed to providing a positive electrode active material which is improved in high-temperature storage stability and lifespan characteristics by including both a lithium composite oxide and a lithium alloy oxide, which are defined herein.

Moreover, the present invention is also directed to providing a lithium secondary battery using a positive electrode including the positive electrode active material defined herein.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

One aspect of the present invention may provide a lithium composite oxide including primary particles represented by Formula 1 below and secondary particles formed by agglomerating the primary particles.

$$Li_aNi_{1-(b+c+d)}Co_bM1_cM2_dO_2 \quad [\text{Formula 1}]$$

(wherein,

M1 is at least one selected from Mn and Al,

M2 is at least one selected from Ti, Zr, Mg, V, B, Mo, Zn, Nb, Ba, Ta, Fe, Cr, Sn, Hf, Ce, W, Nd and Gd, $0.5 \le a \le 1.5$, $0.01 \le b \le 0.50$, $0.01 \le c \le 0.20$, and $0.001 \le d \le 0.20$)

In one exemplary embodiment, the M2 element included in the primary particles present at the surface of the secondary particle may have a concentration gradient which decreases toward the center of the secondary particle.

Another aspect of the present invention may provide a positive electrode active material including the lithium composite oxide defined herein and a lithium alloy oxide existing at least a part of a) the interface between primary particles and b) the surface of a secondary particle.

In one exemplary embodiment, the lithium alloy oxide may have a concentration gradient which decreases from the surface to the center of the secondary particle. Therefore, the collapse of the entire structure of the positive electrode active material during an electrochemical reaction may be prevented by the lithium alloy oxide.

Still another aspect of the present invention may provide a positive electrode slurry composition which includes the positive electrode active material defined herein, a conductive material and a binder.

Yet another aspect of the present invention may provide a lithium secondary battery which uses a positive electrode including the positive electrode active material defined herein.

DETAILED DESCRIPTION OF EXEMPLARY EMBODIMENTS

Figure 1:
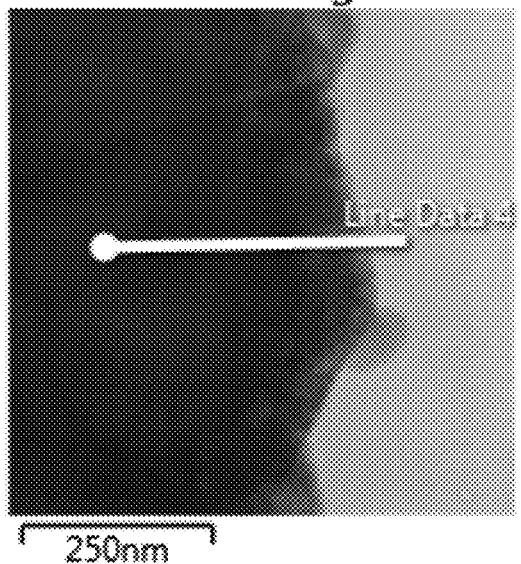
FIGS. 1 to 5 show the results of transmission electron microscope (TEM) analysis and TEM/EDS mapping for a positive electrode active material prepared according to an exemplary embodiment of the present invention. In the TEM/EDS mapping results shown in FIGS. 2 to 5, light dots represent regions of corresponding metal elements.
Figure 2:
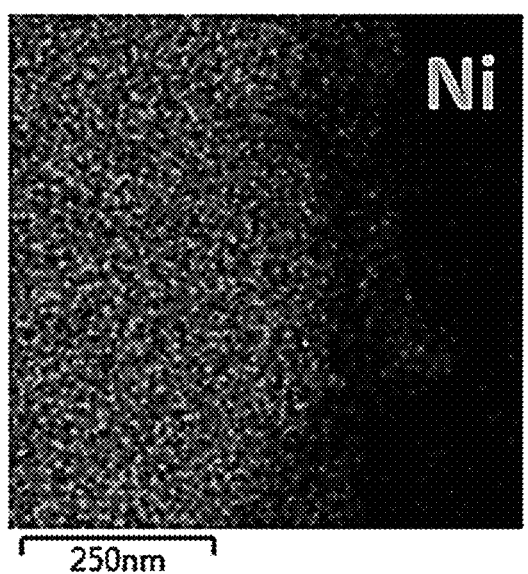
Figure 3:
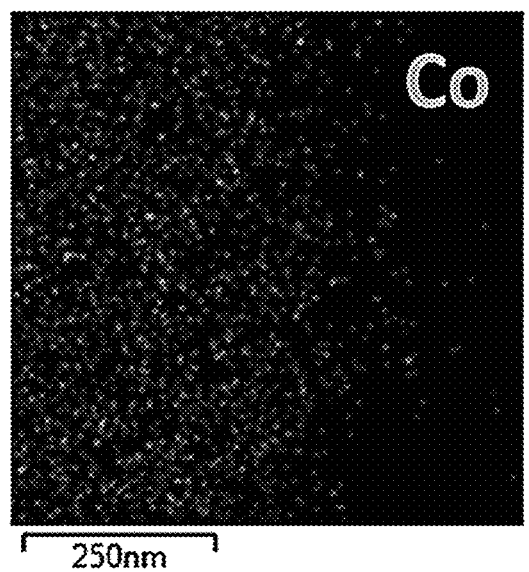
Figure 4:
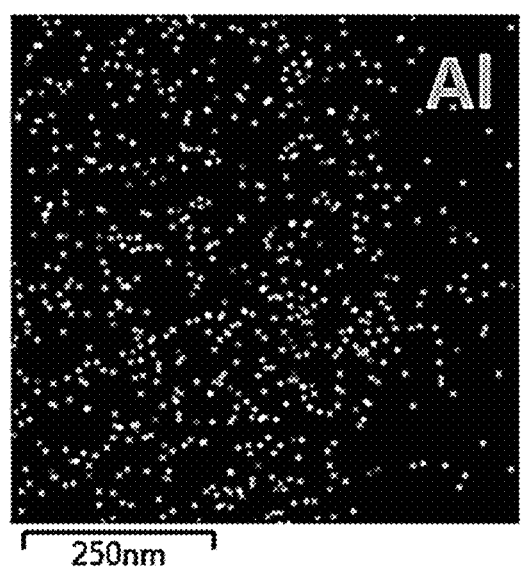

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a lithium composite oxide according to the present invention, a positive electrode active material for a lithium secondary battery including the lithium composite oxide, and a lithium secondary battery using a positive electrode including the positive electrode active material will be described in further detail.

Lithium Composite Oxide

According to an aspect of the present invention, a lithium composite oxide including primary particles represented by Formula 1 below and secondary particles formed by agglomerating the primary particles may be provided.

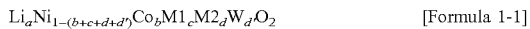

$$Li_aNi_{1-(b+c+d)}Co_bM1_cM2_dO_2 \qquad \text{[Formula 1]}$$

(wherein, M1 is at least one selected from Mn and Al, M2 includes at least one selected from Ti, Zr, Mg, V, B, Mo, Zn, Nb, Ba, Ta, Fe, Cr, Sn, Hf, Ce, W, Nd and Gd, $0.5 \leq a \leq 1.5$, $0.01 \leq b \leq 0.50$, $0.01 \leq c \leq 0.20$, and $0.001 \leq d \leq 0.20$)

In one exemplary embodiment, the primary particles may be an oxide represented by Formula 1-1 below or may include an oxide represented by Formula 1-1 below.

$$Li_aNi_{1-(b+c+d+d')}Co_bM1_cM2_dW_{d'}O_2 \qquad \text{[Formula 1-1]}$$

(wherein, M1 is at least one selected from Mn and Al, M2 includes at least one selected from Ti, Zr, Mg, V, B, Mo, Zn, Nb, Ba, Ca, Ta, Fe, Cr, Sn, Hf, Ce, Nd and Gd, $0.5 \leq a \leq 1.5$, $0.01 \leq b \leq 0.50$, $0.01 \leq c \leq 0.20$, $0 \leq d \leq 0.20$, and $0.001 \leq d' \leq 0.20$)

In the present invention, the lithium composite oxide may be defined as particles including the primary particles and an agglomerate formed by agglomerating (physically bonding) a plurality of the primary particles. The primary particles may have a rod shape, an oval shape and/or an irregular shape.

The primary particles may be come into contact with neighboring primary particles, thereby forming an interface or grain boundary between the primary particles. In addition, the primary particles may be spaced apart from neighboring primary particles in the secondary particle, and thus an inner pore may be formed.

Here, the average diameter of the primary particle may be 0.1 to 6.0 μm, and the average diameter of the secondary particle may be 6.0 to 20.0 μm.

Here, the primary particles may come into contact with the inner pore without a grain boundary formed by coming into contact with neighboring primary particles, such that a surface may be formed in the secondary particle. Meanwhile, a surface in which the primary particles present at the outermost surface of the secondary particle are exposed to the outside air forms the surface of the secondary particle.

In addition, an M2 element and/or W, which are/is included in the primary particles present at the surface of the secondary particle, may exhibit concentration gradients which decrease toward the center of the secondary particle. That is, the directions of the concentration gradient(s) of the M2 element and/or W formed in the primary particles may be directions from the surface to the center of the secondary particle.

Accordingly, a diffusion path (lithium ion diffusion path) of lithium ions arranged toward the center of the secondary particle may be formed in the primary particles (refer to FIG. 7), and therefore, it is possible to improve lithium ion conductivity due to the lithium composite oxide, and further, the positive electrode active material.

More specifically, the concentration gradient(s) of the M2 element and/or W included in the primary particles may be greater at the surface side of the secondary particle than that at the center side of the secondary particle, on the basis of the center of the primary particle.

In this case, the secondary particle may include a first region and a second region, which have mutually different concentrations of the M2 element. Here, the first and second regions may be defined as regions having mutually different W concentrations.

Here, a region exhibiting concentration gradient(s) of the M2 element and/or W included in the primary particles, which decrease(s) toward the center of the secondary particle, may be a first region. That is, the concentration gradient(s) of the M2 element and/or W defined herein refers to a concentration gradient exhibited based on homogeneous primary particles.

For example, when a distance from the outermost surface of the secondary particle forming the lithium composite oxide to the center of the secondary particle is R, if a region having a distance (R') from the outermost surface of the secondary particle of 0 to 0.02R is defined as a first region, the M2 element and/or W present in the first region may exhibit a concentration gradient which decreases toward the center of the secondary particle in the primary particle.

On the other hand, Ni present in the first region may exhibit a concentration gradient which increases toward the center of the secondary particle in the primary particle, opposite to the M2 element and/or W. Here, the center of the secondary particle may refer to as the very center of the secondary particle.

Here, the W content (at %) included in the primary particles present in the first region of the secondary particle may be higher than the Ni content (at %). In addition, when the M2 element is included in the primary particles, the sum of the M2 element and W contents (at %) included in the primary particles present in the first region of the secondary particle may be larger than the Ni content (at %).

Figure 8:
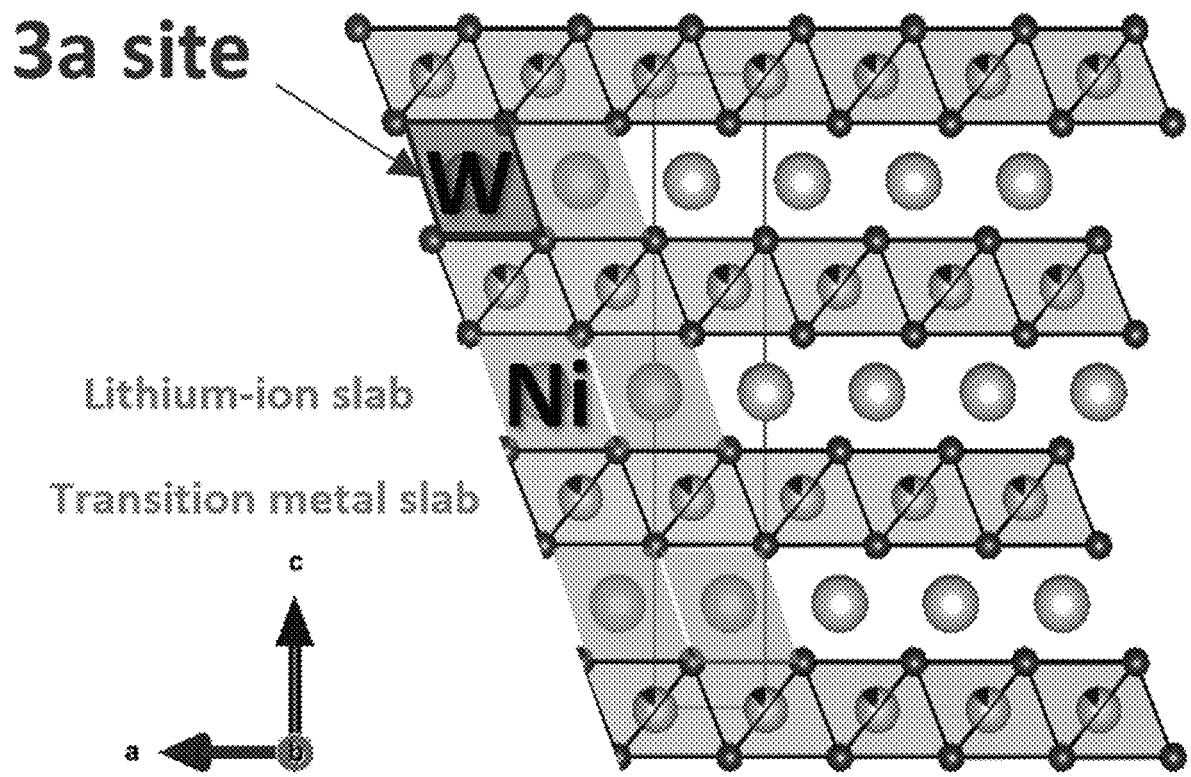
FIG. 8 is a schematic diagram showing the crystal structure in which a part of Ni inserted into Li 3a sites is substituted with W in a positive electrode active material prepared according to an exemplary embodiment of the present invention.

Referring to FIG. 8, the opposite concentration gradient patterns of the above-described M2 element and/or W and Ni may be exhibited by substituting the M2 element and/or W included in the primary particles present in the first region with Ni inserted into at least one selected from Li 3a and 3b sites of atom-occupied sites in the lattice structure of the lithium composite oxide.

Here, in the primary particles present in the first region of the secondary particles, the proportion of W ($W_{occ}$) inserted into Li 3a sites may be larger than the proportion of Ni ($Ni_{occ}$) inserted into Li 3a sites, as confirmed by Rietveld analysis of an X-ray diffraction pattern. In addition, when the M2 element is included in the primary particles, in the primary particles present in the first region of the secondary particle, the proportion of W ($W_{occ}$) inserted into Li 3a sites and the proportion of the M2 element ($M2_{occ}$) inserted into Li 3a sites, obtained by the Rietveld analysis of an X-ray diffraction pattern, may be greater than the proportion of Ni ($Ni_{occ}$) inserted into Li 3a sites.

As described above, since the contents (or the sum of the contents) of the M2 element and/or W present in the first region of the secondary particle are greater than that inserted into the Li 3a sites, rather than simply the Ni content, obtained by the Rietveld analysis of a X-ray diffraction pattern, the structural stability of the primary particles, and further the secondary particles formed by agglomerating the primary particles, may be improved, and therefore, the electrical characteristics and reliability of the prepared positive electrode active material may be increased.

The above-described opposite concentration gradient patterns of the M2 element and/or W and Ni may be exhibited by substituting the M2 element and/or W included in the primary particles present in the first region with Ni inserted into at least one of Li 3a and 3b sites of the lithium composite oxide.

Here, rates of change in the concentrations of the M2 element and/or W included in the primary elements present in the first region may be 50% or more, and preferably, 60% or more, but the present invention is not limited thereto.

In addition, the region excluding the first region may be defined as a second region, and when a region having a distance (R') from the outermost surface of the secondary particle of 0 to 0.02R is defined as a first region, a region having a distance (R') from the outermost surface of the secondary particle of more than 0.02R to 1.0R may be defined as a second region. Here, the M2 element and/or W included in the primary particles present in the second region may not have concentration gradients in ways that a concentration increases or decreases in a predetermined direction in the primary particle.

In another exemplary embodiment, rates of change in the concentrations of the M2 element and/or W in the primary particles present in the second region may be 49% or less, preferably, 30% or less, and more preferably, 15% or less. Also, in this case, rates of change in the concentrations of the M1 element and Co included in the primary particles present in the first and second regions may be 49% or less, preferably, 30% or less, and more preferably, 15% or less.

As described above, the secondary particle constituting the lithium composite oxide is divided into a first region and a second region, in which the concentrations of the M2 element and/or W are different, and the M2 element and/or W may exhibit different patterns of concentration gradients in the first and second regions, respectively, thereby improving the structural stability of the lithium composite oxide.

Positive Electrode Active Material for Lithium Secondary Battery

According to another aspect of the present invention, a positive electrode active material including the lithium composite oxide defined in the present invention and a lithium alloy oxide existing at least a part of a) the interface between primary particles and b) the surface of secondary particles may be provided. Here, since the lithium composite oxide is the same as described above, for convenience, detailed description will be omitted, and hereinafter, components that have not been described above will be explained.

The lithium alloy oxide may be physically and/or chemically combined with the primary particles forming the lithium composite oxide and/or the secondary particles.

Here, the lithium alloy oxide may be used to entirely or partially coat the interface between the primary particles forming the lithium composite oxide and the surface of the secondary particle, and in some cases, the lithium alloy oxide may be distributed in a particle phase entirely or partially at the interface between the primary particles forming the lithium composite oxide and the surface of the secondary particle.

Accordingly, the positive electrode active material according to the exemplary embodiment includes the above-described lithium alloy oxide, thereby increasing structural stability, and when the positive electrode active material is used in a lithium secondary battery, high-temperature storage stability and lifespan characteristics of the positive electrode active material may be improved. In addition, the lithium alloy oxide may serve as a diffusion path of lithium ions in the positive electrode active material, and thus affect the improvement of the efficiency of the lithium secondary battery.

In addition, in some cases, the lithium alloy oxide may be present in the inner pore formed inside the secondary particles as well as at at least a part of the interface between the primary particles, which form the lithium composite oxide, and the surface of the secondary particle.

Here, the lithium alloy oxide may be represented by Formula 2 below.

 [Formula 2]

(wherein, M3 is at least one selected from Ti, Zr, Mg, V, B, Mo, Zn, Nb, Ba, Ca, Ta, Fe, Cr, Sn, Hf, Ce, W, Nd and Gd, 0≤e≤6, 0<f≤6, and 0<g≤10)

As shown in Formula 2, the lithium alloy oxide is an oxide formed by complexing lithium and a metal element represented as M3, and may be, for example, Li(W)O, Li(Zr)O, Li(Ti)O, Li(B)O, WO$_x$, ZrO$_x$, or TiO$_x$. However, although the above examples are merely provided for convenience of understanding, the lithium alloy oxide defined in the present invention is not limited to the above examples. Therefore, in experimental examples to be described below, for convenience, experimental results for some examples of a representative lithium alloy oxide that can be represented by Formula 1 are described.

In another exemplary embodiment, the lithium alloy oxide may be an oxide prepared by complexing lithium and at least two metal elements represented as M3, or may further include an oxide, represented as M3, prepared by complexing lithium and at least two types of metal elements. The lithium alloy oxide prepared by complexing lithium and at least two metal elements represented as M3 may be, for example, Li(W/Ti)O, Li(W/Zr)O, Li(W/Ti/Zr)O, or Li(W/Ti/B)O, but the present invention is not necessarily limited thereto.

In addition, in this case, the lithium tungsten oxide may have a lattice structure that is doped with at least one type of metal element. That is, the lithium alloy oxide may have a lattice structure formed of a lithium tungsten oxide (e.g., Li$_2$WO$_4$, Li$_2$W$_2$O$_7$, Li$_4$WO$_5$, Li$_6$WO$_6$ or Li$_6$W$_2$O$_9$), in which a part of tungsten atoms is substituted with an M3 element. Here, as a metal element substituting for tungsten in the lattice structure, at least one selected from Ti, Zr, Mg, V, B, Mo, Zn, Nb, Ba, Ca, Ta, Fe, Cr, Sn, Hf, Ce, Nd and Gd may be used.

In one exemplary embodiment, the lithium alloy oxide may exhibit a concentration gradient which decreases from the surface to the center of the secondary particle constituting the lithium composite oxide. Accordingly, the concentration of the lithium alloy oxide may be reduced from the outermost surface to the center of the secondary particle.

As described above, as the lithium alloy oxide has a concentration gradient which decreases from the surface to the center of the secondary particle constituting the lithium composite oxide, residual lithium present at the surface of the positive electrode active material is effectively reduced, thereby preventing a side reaction by the unreacted residual lithium beforehand, and also preventing the crystallinity in the inside of the surface of the positive electrode active material from being lowered by the lithium alloy oxide. In addition, the collapse of the entire structure of the positive electrode active material during an electrochemical reaction may be prevented by the lithium alloy oxide.

In another exemplary embodiment, the lithium alloy oxide may include a first alloy oxide represented by Formula 3 below and a second lithium alloy oxide represented by Formula 4 below.

$$Li_hW_iO_j \quad \text{[Formula 3]}$$

(wherein, 0≤h≤6, 0<i≤6, and 0<j≤10)

$$Li_kM4_mO_n \quad \text{[Formula 4]}$$

(wherein, M4 is at least one selected from Ti, Zr, Mg, V, B, Mo, Zn, Nb, Ba, Ca, Ta, Fe, Cr, Sn, Hf, Ce, Nd and Gd, 0≤k≤6, 0<m≤6, and 0<n≤10)

Here, the first lithium alloy oxide and the second lithium alloy oxide may exhibit a concentration gradient that decreases from the surface to the center of the secondary particle forming the lithium composite oxide. Accordingly, the concentration of the lithium alloy oxide may decrease from the outermost surface to the center of the secondary particle.

Here, it is preferable that the reduction rate of the concentration of the second lithium alloy oxide be higher than that of the first lithium alloy oxide, and as the reduction rate of the concentration of the second lithium alloy oxide is higher than that of the first lithium alloy oxide, the structural stability of the positive electrode active material including the lithium alloy oxide may be maintained. In addition, an efficient diffusion path of lithium ions in the positive electrode active material is created, and thus a positive effect on improvement in the efficiency of a lithium secondary battery can be imparted.

Therefore, when positive electrodes including a positive electrode active material according to various exemplary embodiments of the present invention are used as a positive electrode of a lithium secondary battery, high-temperature storage stability and lifespan characteristics may be more improved.

According to an additional exemplary embodiment, the second lithium alloy oxide may include a lithium zirconium oxide represented by Formula 5 below and a lithium titanium oxide represented by Formula 6 below.

$$Li_oZr_pO_q \quad \text{[Formula 5]}$$

(wherein, 0≤o≤6, 0≤p≤6, and 0≤q≤10)

$$Li_rTi_sO_t \quad \text{[Formula 6]}$$

(wherein, 0≤r≤6, 0≤s≤6, and 0<t≤10)

The lithium zirconium oxide represented by Formula 5 and the lithium titanium oxide represented by Formula 6 may contribute to increasing the structural stability of the positive electrode active material as well as the lithium tungsten oxide represented by Formula 3, and an efficient diffusion path of lithium ions may be created in the positive electrode active material.

Here, the lithium zirconium oxide and the lithium titanium oxide may exhibit concentration gradients that decrease from the surface to the center of the secondary particle forming the lithium composite oxide, like the lithium tungsten oxide. Therefore, the concentrations of the lithium zirconium oxide and the lithium titanium oxide may decrease from the outermost surface to the center of the secondary particle.

Here, to maintain the structural stability and crystallinity of a positive electrode active material including both of the lithium zirconium oxide and the lithium titanium oxide as well as the lithium tungsten oxide, the reduction rate of the concentration of the lithium zirconium oxide is preferably higher than that of the lithium titanium oxide.

Lithium Secondary Battery

Another aspect of the present invention may provide a positive electrode including a positive electrode current collector and a positive electrode active material layer formed on the positive electrode current collector. Here, the positive electrode active material layer may include any one of the positive electrode active materials according to various exemplary embodiments of the present invention. Therefore, since the positive electrode active material is the same as described above, for convenience, detailed description will be omitted, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the positive electrode current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included selectively as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a positive electrode slurry composition prepared by dissolving or dispersing the positive electrode active material, and selectively, a binder and a conductive material in a solvent on the positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer selectively includes a binder and a conductive material, as well as the negative electrode active material.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flaketype, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer maybe prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Experimental Example 1

(1) Preparation of Positive Electrode Active Material

Example 1

A spherical $Ni_{0.92}Co_{0.08}(OH)_2$ hydroxide precursor was synthesized by a co-precipitation method. In a 90 L reactor, 25 wt % NaOH and 30 wt % $NH_4OH$ were input into an aqueous 1.5M sulfuric acid solution of a transition metal complex in which $NiSO_4 \cdot 7H_2O$ and $CoSO_4 \cdot 7H_2O$ were mixed in a molar ratio of 92:8. The pH in the reactor was maintained at 11.5, the temperature of the reactor was maintained at 60° C., and an inert gas $N_2$ was added to the reactor to prevent the prepared precursor from being oxidized. After the completion of synthesis and stirring, washing and dehydration were performed using filter press (F/P) equipment, thereby obtaining a $Ni_{0.92}Co_{0.08}(OH)_2$ hydroxide precursor.

The hydroxide precursor was mixed with a Li-containing raw material LiOH and an Al-containing raw material $Al_2O_3$ using a mixer, and the resulting mixture was subjected to the following: a temperature of a calcination furnace was raised by 1° C. per minute while maintaining a 02 atmosphere, maintained at 350° C. for 4 hours, further raised by 2° C. per minute, and then maintained at a thermal treatment temperature of 650° C. for 10 hours, followed by natural cooling. The obtained positive electrode active material was mixed with a W-containing raw material ($WO_3$) using a mixer. In the same calcination furnace, the temperature was increased by 2° C. per minute while maintaining the $O_2$ atmosphere, and the furnace was maintained at a thermal treatment temperature of 600° C. for 5 hours, followed by natural cooling. Subsequently, each of thermal treatment and cooling were carried out once under the same conditions as above. The positive electrode active material prepared in Example 1 was confirmed to have composition formula $Li_{1.05}Ni_{0.9060}Co_{0.0790}Al_{0.0140}W_{0.0010}O_2$.

Example 2

A positive electrode active material was prepared by the same method as described in Example 1, except that a W-containing raw material ($WO_3$) was mixed with the positive electrode active material such that the positive electrode active material obtained in Example 2 has composition formula $Li_{1.04}Ni_{0.9020}Co_{0.0790}Al_{0.0140}W_{0.0050}O_2$.

Example 3

A positive electrode active material was prepared by the same method as described in Example 1, except that a W-containing raw material ($WO_3$) was mixed with the positive electrode active material such that the positive electrode active material obtained in Example 3 has composition formula $Li_{1.03}Ni_{0.8970}Co_{0.0790}Al_{0.0140}W_{0.010}O_2$.

Example 4

A positive electrode active material was prepared by the same method as described in Example 1, except that a W-containing raw material ($WO_3$) and a B-containing raw material ($B_2O_3$) were mixed with the positive electrode active material such that the positive electrode active material obtained in Example 4 has composition formula $Li_{1.04}Ni_{0.9037}Co_{0.0786}Al_{0.0138}W_{0.0029}B_{0.001}O_2$.

Example 5

A positive electrode active material was prepared by the same method as described in Example 4, except that instead of a B-containing raw material ($B_2O_3$), an Nb-containing raw material ($Nb_2O_5$) was used such that the positive electrode active material prepared in Example 5 has composition formula $Li_{1.06}Ni_{0.9029}Co_{0.0788}Al_{0.0142}W_{0.0031}Nb_{0.001}O_2$.

Example 6

A positive electrode active material was prepared by the same method as described in Example 4, except that, instead of a B-containing raw material ($B_2O_3$), a Ce-containing raw material ($CeO_2$) was used such that the positive electrode active material prepared in Example 6 has composition formula $Li_{1.04}Ni_{0.9034}Co_{0.0787}Al_{0.0138}W_{0.003}Ce_{0.0011}O_2$.

Example 7

A positive electrode active material was prepared by the same method as described in Example 4, except that, instead of a B-containing raw material ($B_2O_3$), a Ti-containing raw material ($TiO_2$) was used such that the positive electrode active material prepared in Example 7 has composition formula $Li_{1.03}Ni_{0.9030}Co_{0.0789}Al_{0.0143}W_{0.0028}Ti_{0.001}O_2$.

Example 8

A positive electrode active material was prepared by the same method as described in Example 4, except that, instead of a B-containing raw material ($B_2O_3$), a Zr-containing raw material ($ZrO_2$) was used such that the positive electrode active material prepared in Example 8 has composition formula $Li_{1.06}Ni_{0.9032}Co_{0.0787}Al_{0.0141}W_{0.003}Zr_{0.001}O_2$.

Example 9

A positive electrode active material was prepared by the same method as described in Example 4, except that, instead of a B-containing raw material ($B_2O_3$), a Zr-containing raw material ($ZrO_2$) and a Ti-containing raw material ($TiO_2$)

were used such that the positive electrode active material prepared in Example 9 has composition formula $Li_{1.06}Ni_{0.9027}Co_{0.0787}Al_{0.0141}W_{0.0031}Ti_{0.0009}O_2$.

Example 10

A positive electrode active material was prepared by the same method as described in Example 1, except that, in Example 1, a positive electrode active material was mixed with a W-containing raw material ($WO_3$) and thermally treated once at 600° C.

Comparative Example 1

A $Ni_{0.92}Co_{0.08}(OH)_2$ hydroxide precursor was mixed with a Li-containing raw material LiOH and an Al-containing raw material $Al_2O_3$ using a mixer, and the resulting mixture was subjected to the following: a temperature of a calcination furnace was raised 1° C. per minute while an $O_2$ atmosphere was maintained, and maintained at a thermal treatment temperature of 650° C. for 10 hours, followed by natural cooling.

The obtained positive electrode active material was mixed with a W-containing raw material ($WO_3$) using a mixer. In the same calcination furnace, the temperature was increased 2° C. per minute while maintaining the $O_2$ atmosphere, and the furnace was maintained at a thermal treatment temperature of 700° C. for 5 hours, followed by natural cooling. Subsequently, each of thermal treatment and cooling were carried out once under the same conditions as above, thereby preparing a positive electrode active material.

Comparative Example 2

A positive electrode active material was prepared by the same method as described in Comparative Example 1, except that the positive electrode active material of Comparative Example 1 and a W-containing raw material ($WO_3$) were mixed and thermally treated once at 700° C.

Comparative Example 3

A $Ni_{0.92}Co_{0.08}(OH)_2$ hydroxide precursor was mixed with a Li-containing raw material LiOH and an Al-containing raw material $Al_2O_3$ using a mixer, and the resulting mixture was subjected to the following: a temperature of a calcination furnace was raised 1° C. per minute while an $O_2$ atmosphere was maintained, and maintained at a thermal treatment temperature of 650° C. for 10 hours, followed by natural cooling.

The obtained positive electrode active material was mixed with a W-containing raw material ($WO_3$) and a Ti-containing raw material ($TiO_2$) using a mixer. In the same calcination furnace, the temperature was increased 2° C. per minute while maintaining the $O_2$ atmosphere, and the furnace was maintained at a thermal treatment temperature of 700° C. for 5 hours and naturally cooled, thereby obtaining a positive electrode active material.

Comparative Example 4

A $Ni_{0.92}Co_{0.08}(OH)_2$ hydroxide precursor was mixed with a Li-containing raw material LiOH and an Al-containing raw material $Al_2O_3$ using a mixer, and the resulting mixture was subjected to the following: a temperature of a calcination furnace was raised 1° C. per minute while an $O_2$ atmosphere was maintained, and maintained at a thermal treatment temperature of 650° C. for 10 hours, followed by natural cooling.

The obtained positive electrode active material was mixed with a W-containing raw material ($WO_3$) and a Zr-containing raw material ($ZrO_2$) using a mixer. In the same calcination furnace, the temperature was increased 2° C. per minute while maintaining the $O_2$ atmosphere, and the furnace was maintained at a thermal treatment temperature of 700° C. for 5 hours and naturally cooled, thereby preparing a positive electrode active material.

(2) TEM/EDS Analyses for Positive Electrode Active Material

Figure 5:
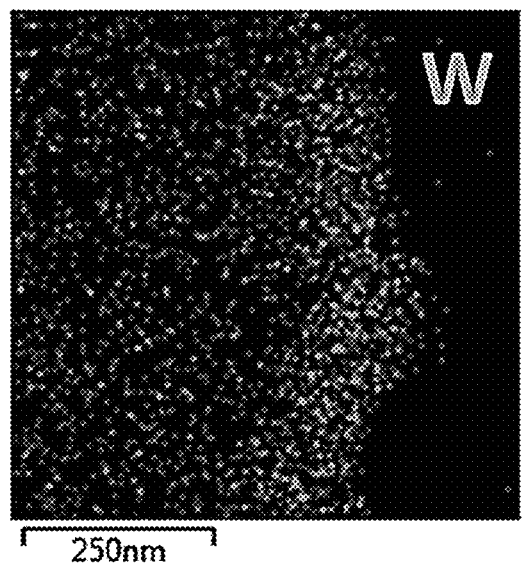
Figure 6:
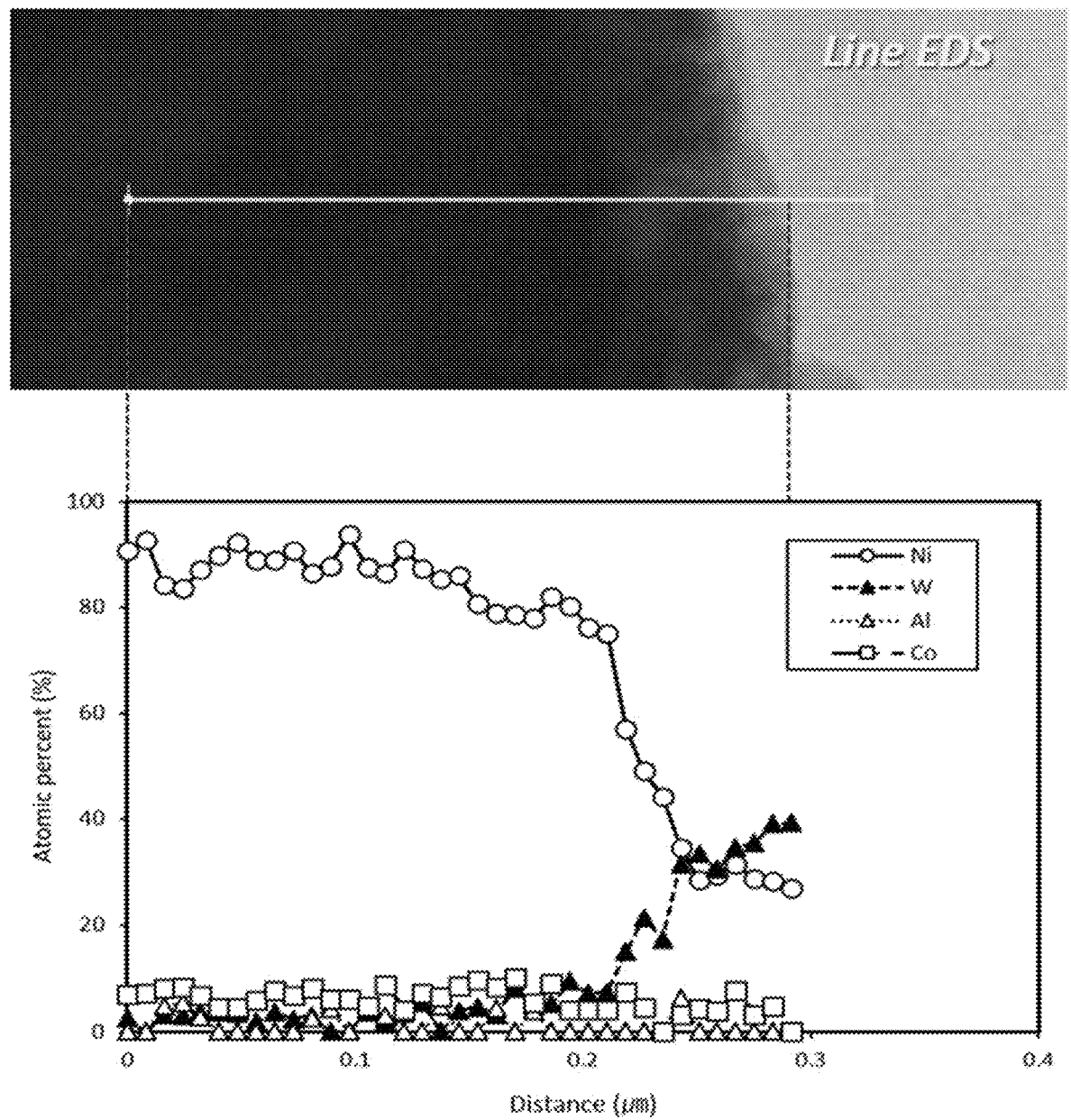
FIG. 6 shows a graph (line sum spectrum) showing contents of metal elements (Ni, Co, Al and W) measured according to the results of TEM/EDS mapping for a positive electrode active material prepared according to an exemplary embodiment of the present invention.

FIGS. 1 to 5 show the results of TEM analysis and TEM/EDS mapping for primary particles constituting the positive electrode active material prepared according to Example 1, and FIG. 6 shows a graph (line sum spectrum) showing the contents of metal elements (Ni, Co, Al and W) measured according to the TEM/EDS mapping results.

FIG. 1 shows a part from the outermost surface of primary particles constituting the positive electrode active material prepared in Example 1, and FIGS. 2 to 5 show the distribution of Ni, Co, Al and W present in the primary particles shown in FIG. 1, respectively.

Referring to FIGS. 2 to 6, it can be confirmed that W included in the primary particles located at the surface of the positive electrode active material prepared in Example 1 has a concentration gradient which decreases from the surface (right) to the center (left) of secondary particles, whereas Ni has a concentration gradient which increases from the surface to the center of the secondary particle. Meanwhile, it can be confirmed that, unlike Ni and W, Co and Al do not exhibit a wide variation in concentration change or a concentration gradient in secondary particles in the positive electrode active material prepared in Example 1.

Figure 7:
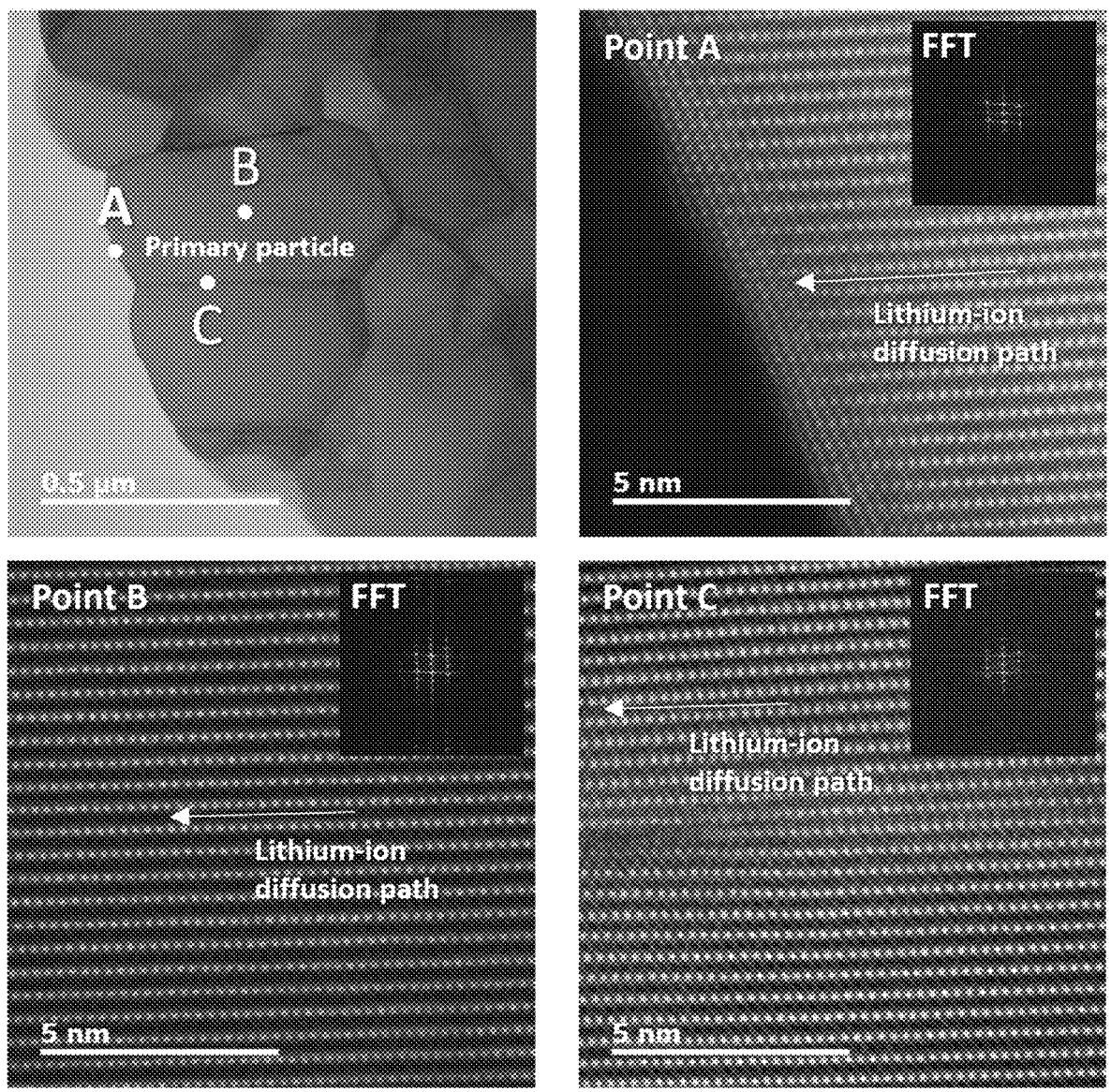
FIG. 7 shows a HR-TEM image and diffraction patterns (FFT) at respective spots for a positive electrode active material prepared according to an exemplary embodiment of the present invention.

FIG. 7 shows an HR-TEM image and diffraction patterns (FFT) for different spots of the positive electrode active material prepared according to Example 8. In FIG. 7, the A spot represents the surface of the primary particle, the B spot represents the center of the primary particle, and the C spot represents the grain boundary between neighboring primary particles in a secondary particle.

Referring to FIG. 7, it can be confirmed that a lithium ion diffusion path is formed in the direction toward the surface of the secondary particle at the B spot representing the center of the primary particle. In addition, a lithium ion diffusion path is also formed in the direction toward the surface of the secondary particle at both of the A spot representing the surface of the primary particle and the C spot representing the grain boundary between neighboring primary particles in a secondary particle.

In addition, referring to FIG. 8, as will be described below with specific experimental results, the primary particles constituting each of the positive electrode active materials prepared according to Examples 1 to 9 may have a crystal structure in which a part of Ni inserted into the Li 3a sites is substituted with W and a doping metal, other than W. In some cases, the sum of proportions of W inserted into Li 3a sites of the primary particles located at the surface of the positive electrode active material and a doping metal, other than W, may be higher than the Ni proportion.

Figure 9:
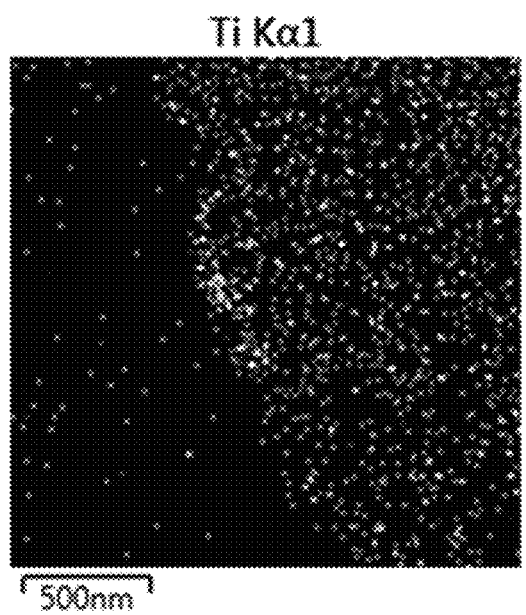
FIGS. 9 and 10 are the results of TEM/EDS mapping for doping metals in a positive electrode active material prepared according to another exemplary embodiment of the present invention. In the TEM/EDS mapping results shown in FIGS. 9 and 10, light dots represent regions of corresponding metal elements.
Figure 10:
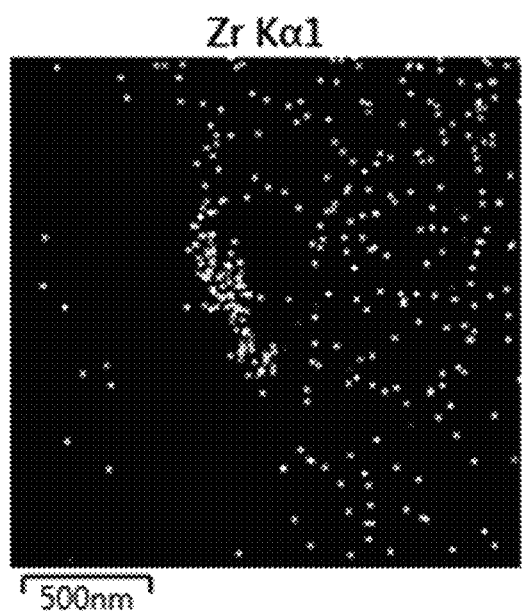

FIG. 9 shows the result of TEM/EDS mapping for the doping metal Ti in the primary particles constituting the positive electrode active material prepared according to Example 7, and FIG. 10 shows the result of TEM/EDS mapping for the doping metal Zr in the primary particles constituting the positive electrode active material prepared according to Example 8.

Referring to FIGS. 9 and 10, it can be confirmed that, like W shown in FIG. 5, Ti and Zr included in the primary particles located at the surface of the respective positive electrode active materials also exhibit a concentration gradient which decreases from the surface (left) to the center (right) of the secondary particle.

Figure 11:
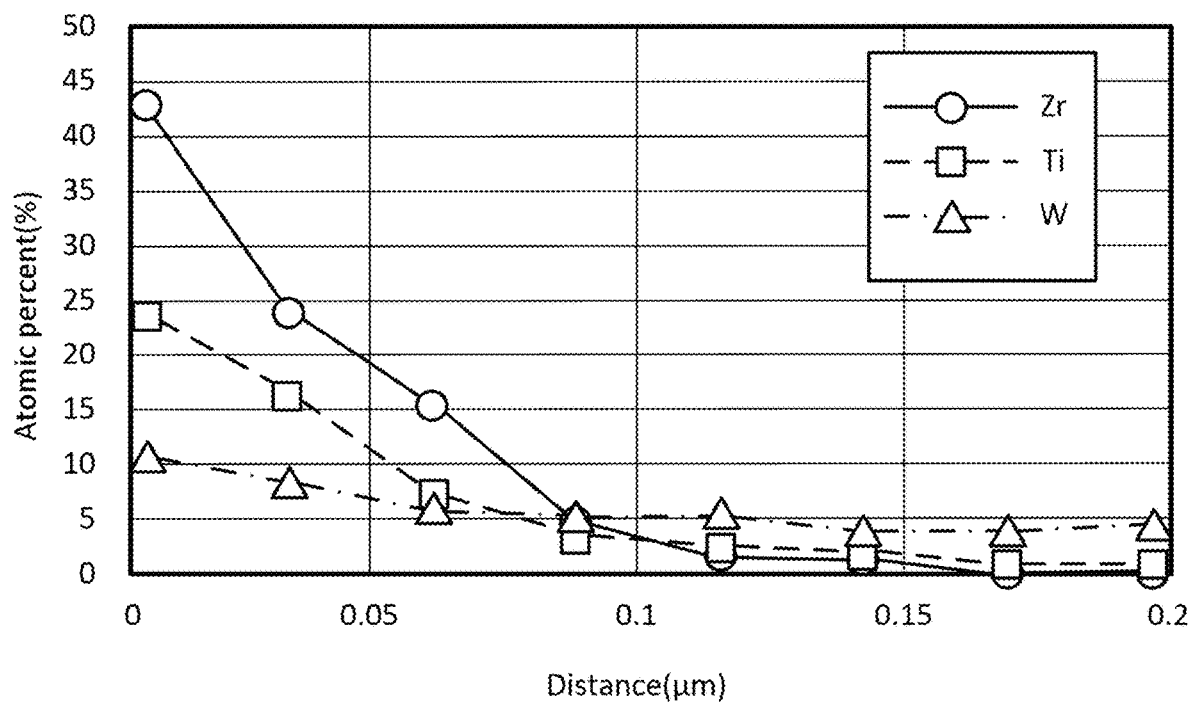
FIG. 11 is a graph (line sum spectrum) showing the contents of doping metal elements (Zr, Ti and W) measured by TEM/EDS mapping for a positive electrode active material prepared according to still another exemplary embodiment of the present invention.

FIG. 11 is a graph (line sum spectrum) showing contents of doping metal elements (Zr, Ti and W) measured according to the results of TEM/EDS mapping for the primary particles constituting the positive electrode active material prepared according to Example 9.

Referring to FIG. 11, it can be confirmed that Zr, Ti and W included in the primary particles constituting the positive electrode active material prepared according to Example 9 have concentration gradients which decrease from the surface to the center of the secondary particle. It can be confirmed that, in the cases of Ti and Zr, the concentration reduction rates in the primary particles located at the surface of the secondary particle are higher than that of W, and the Zr concentration reduction rate in the primary particles located at the surface of the secondary particle is higher than the Ti concentration reduction rate.

The result shown in FIG. 11 may be affected by a concentration gradient of the lithium alloy oxide formed in the same direction as the directions of the concentration gradients of W, Ti and Zr in the primary particles forming the lithium composite oxide.

Figure 12:
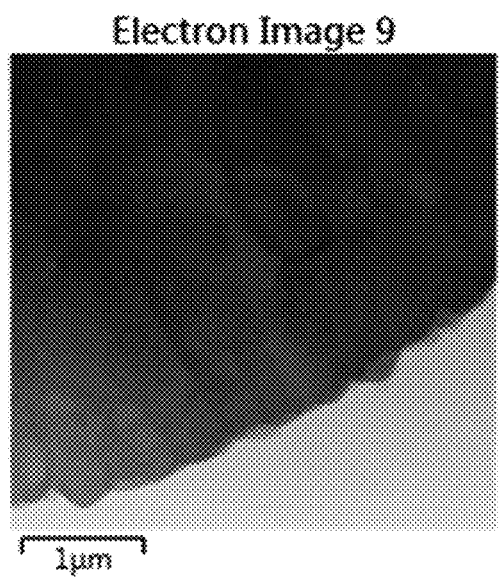
FIGS. 12 to 15 show the results of TEM analysis and TEM/EDS mapping for positive electrode active materials prepared according to Comparative Examples. In the TEM/EDS mapping results shown in FIGS. 13 to 15, light dots represent regions of corresponding metal elements.
Figure 13:
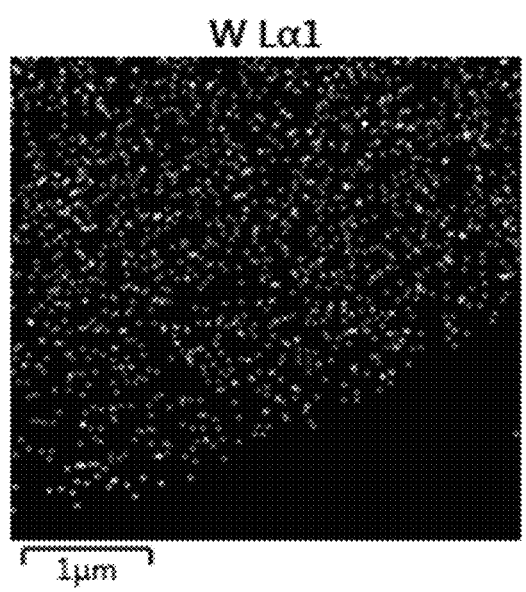

FIGS. 12 and 13 show the results of TEM analysis and TEM/EDS mapping for the positive electrode active material prepared according to Comparative Example 1.

FIG. 12 shows a part from the outermost surface of the primary particle constituting the positive electrode active material prepared in Comparative Example 1, and FIG. 13 shows the distribution of W present in the primary particle shown in FIG. 12.

Referring to FIG. 13, it can be confirmed that, unlike positive electrode active materials according to various Examples of the present invention, in a primary particle, W does not have a concentration gradient which decreases from the surface (lower right) to the center (upper left) of a secondary particle.

Figure 14:
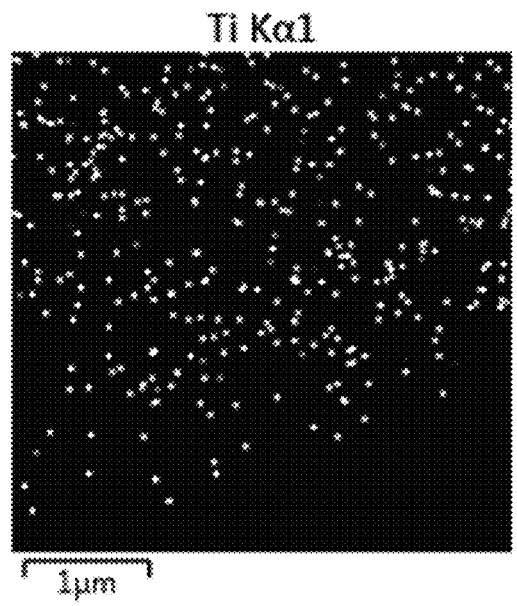
Figure 15:
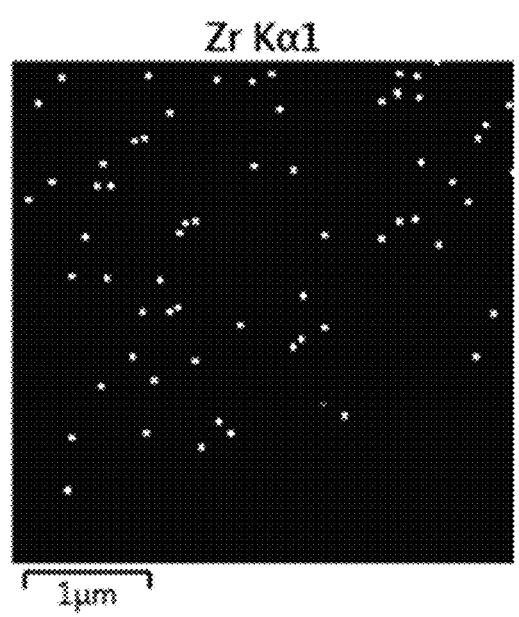

FIG. 14 shows the result of TEM/EDS mapping for doping metal Ti included in the primary particles located at the surface of the positive electrode active material prepared according to Comparative Example 2, and FIG. 15 shows the result of TEM/EDS mapping for doping metal Zr included in the primary particles located at the surface of the positive electrode active material prepared according to Comparative Example 3.

Referring to FIGS. 14 and 15, it can be confirmed that, like W shown in FIG. 11, Ti and Zr also do not exhibit concentration gradients which decrease from the surface (lower right) to the center (upper left) of the secondary particle.

In addition, the average contents of Ni and the doping metals measured according to the results of TEM/EDS mapping for the surface (the region from the outermost surface to 0.05 μm in the secondary particle) of each of the positive electrode active materials prepared according to the Examples and Comparative Examples are shown in Table 1 below.

TABLE 1

| | | Dopant | | | | | | |
| Classification | Ni (at %) | W (at %) | B (at %) | Nb (at %) | Ce (at %) | Ti (at %) | Zr (at %) | Sum (at %) |
|---|---|---|---|---|---|---|---|---|
| Example 1 | 29.5 | 41.4 | — | — | — | — | — | 41.4 |
| Example 2 | 28.8 | 43.6 | — | — | — | — | — | 43.6 |
| Example 3 | 26.7 | 46.8 | — | — | — | — | — | 46.8 |
| Example 4 | 30.1 | 42.5 | 10.3 | — | — | — | — | 52.8 |
| Example 5 | 27.4 | 43.1 | — | 10.2 | — | — | — | 53.1 |
| Example 6 | 29.6 | 42.1 | — | — | 9.7 | — | — | 51.8 |
| Example 7 | 28.7 | 42.8 | — | — | — | 18.5 | — | 61.3 |
| Example 8 | 29.3 | 41.9 | — | — | — | — | 19.2 | 61.1 |
| Example 9 | 29.6 | 42.2 | — | — | — | 17.3 | 18.5 | 78.0 |
| Example 10 | 30.3 | 39.3 | — | — | — | — | — | 39.3 |
| Comparative Example 1 | 32.4 | 25.3 | — | — | — | — | — | 25.3 |
| Comparative Example 2 | 33.5 | 24.9 | — | — | — | — | — | 24.9 |
| Comparative Example 3 | 33.9 | 24.1 | — | — | — | 7.1 | — | 31.2 |
| Comparative Example 4 | 34.6 | 25.3 | — | — | — | — | 7.9 | 33.2 |

Referring to the results shown in Table 1, it can be confirmed that, in the cases of the positive electrode active materials prepared according to the Examples, the sum of the average contents of the doping metals included in primary particles present at the surface (the region from the outermost surface to 0.05 μm in a secondary particle) of a positive electrode active material may be larger than the average content of Ni.

On the other hand, it can be confirmed that, in the case of the positive electrode active materials prepared according to the Comparative Examples, the sum of the average contents of the doping metals included in primary particles present at the surface (the region from the outermost surface to 0.05 μm in a secondary particle) of a positive electrode active material is lower than the average content of Ni.

(3) XRD Analysis of Positive Electrode Active Material

The occupancy (or content) of Ni metal inserted into Li 3a sites of each of the positive electrode active materials prepared according to the Examples and Comparative Examples was measured through Rietveld analysis of an X-ray diffraction pattern. The measurement results are shown in Table 2 below. The Rietveld analysis of the X-ray diffraction pattern was performed on the surface (the region from the outermost surface to 0.05 µm in a secondary particle) of each of the positive electrode active materials prepared according to the Examples and Comparative Examples.

TABLE 2

| Classification | W content (mol %) | $Ni_{occ}$ in 3a site (%) | d(003) (Å) |
|---|---|---|---|
| Example 1 | 0.1 | 1.34 | 4.7293 |
| Example 2 | 0.5 | 1.31 | 4.7300 |
| Example 3 | 1.0 | 1.28 | 4.7302 |
| Example 4 | 0.29 | 1.32 | 4.7296 |
| Example 5 | 0.31 | 1.31 | 4.7296 |
| Example 6 | 0.3 | 1.32 | 4.7298 |
| Example 7 | 0.28 | 1.33 | 4.7297 |
| Example 8 | 0.3 | 1.32 | 4.7301 |
| Example 9 | 0.3 | 1.31 | 4.7299 |
| Example 10 | 0.1 | 1.35 | 4.7294 |
| Comparative Example 1 | 0.1 | 1.38 | 4.7292 |
| Comparative Example 2 | 0.1 | 1.40 | 4.7291 |
| Comparative Example 3 | 0.28 | 1.39 | 4.7291 |
| Comparative Example 4 | 0.3 | 1.38 | 4.7292 |

Referring to the results shown in Table 2, in cases of the positive electrode active materials prepared according to the Examples, it can be confirmed that the occupancy of Ni inserted into Li 3a sites of primary particles present at the surface (the region from the outermost surface to 0.05 µm in a secondary particle) of the positive electrode active material is lower than that of Ni inserted into Li 3a sites of primary particles present at the surface (the region from the outermost surface to 0.05 µm in a secondary particle) of each of the positive electrode active materials prepared according to Comparative Examples 1 to 4.

That is, comparing Example 1 and Comparative Example 1 through the results shown in Table 2, it can be confirmed that, although the W contents present in the positive electrode active materials are the same or similar, the regions in which W is present in the positive electrode active materials are different from each other. A part of W present at the surface of the positive electrode active material may be present while being substituted with Ni inserted into the Li 3a sites, indicating a reduction in occupancy of Ni inserted into the Li 3a sites. As schematically shown in FIG. 8, the result may be particularly caused by the substitution of a part of W present at the surface of the positive electrode active material with Ni inserted into the Li 3a sites. In addition, according to the results shown in Table 2, it can be expected that the positive electrode active materials according to the Examples have higher W contents inserted into Li 3a sites and/or 3b sites than the positive electrode active materials of Comparative Examples.

In addition, X-ray diffraction (XRD) analyses were performed for positive electrode active materials prepared according to Examples 7 to 9 to confirm whether a lithium alloy oxide and an alloy oxide are present or not in the positive electrode active material. The XRD analyses were performed using a Bruker D8 Advance diffractometer with Cu Kα radiation (1.540598 Å).

Figure 16:
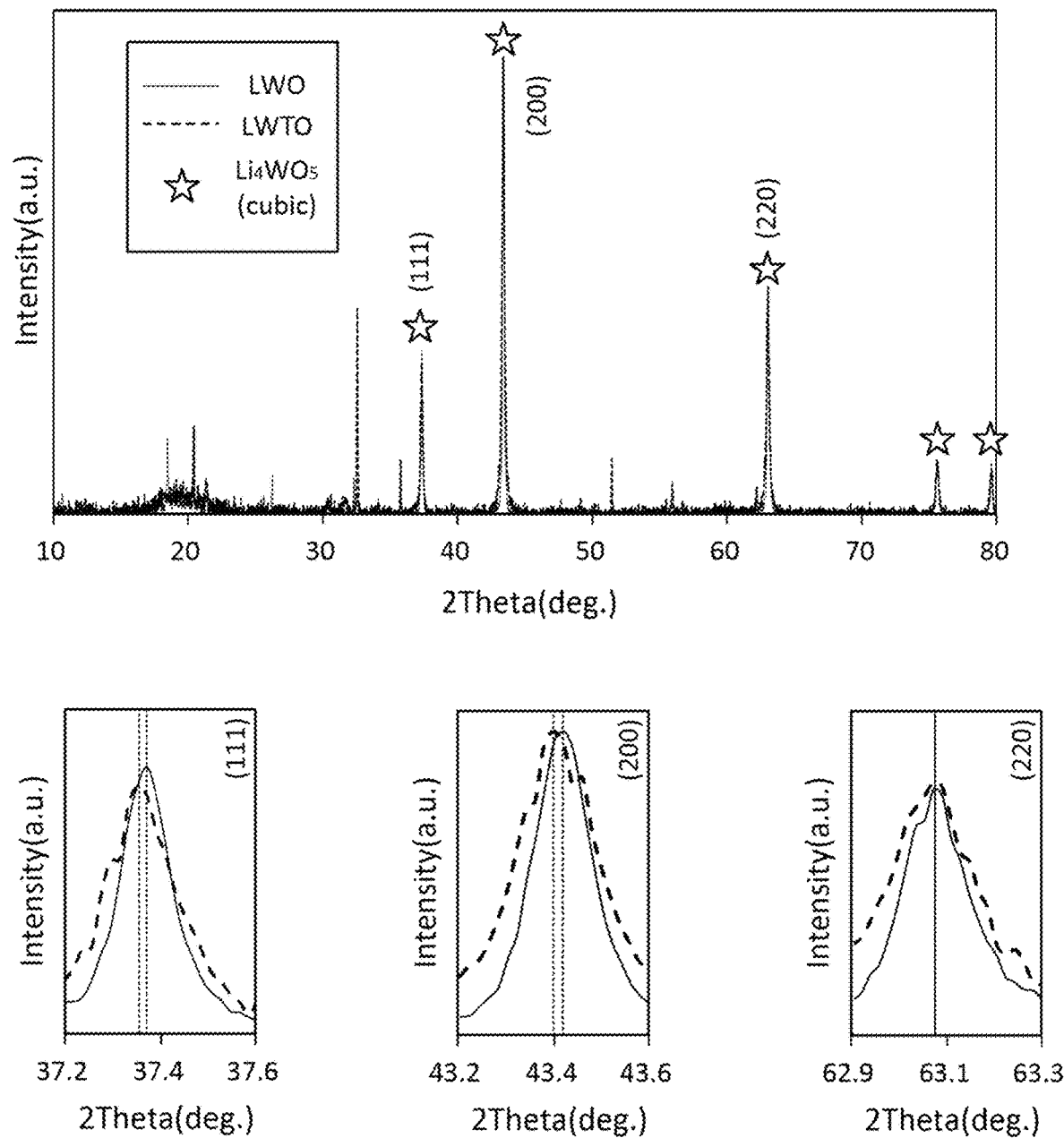
FIGS. 16 to 18 show the results of XRD analyses for positive electrode active materials prepared according to various Examples of the present invention.
Figure 17:
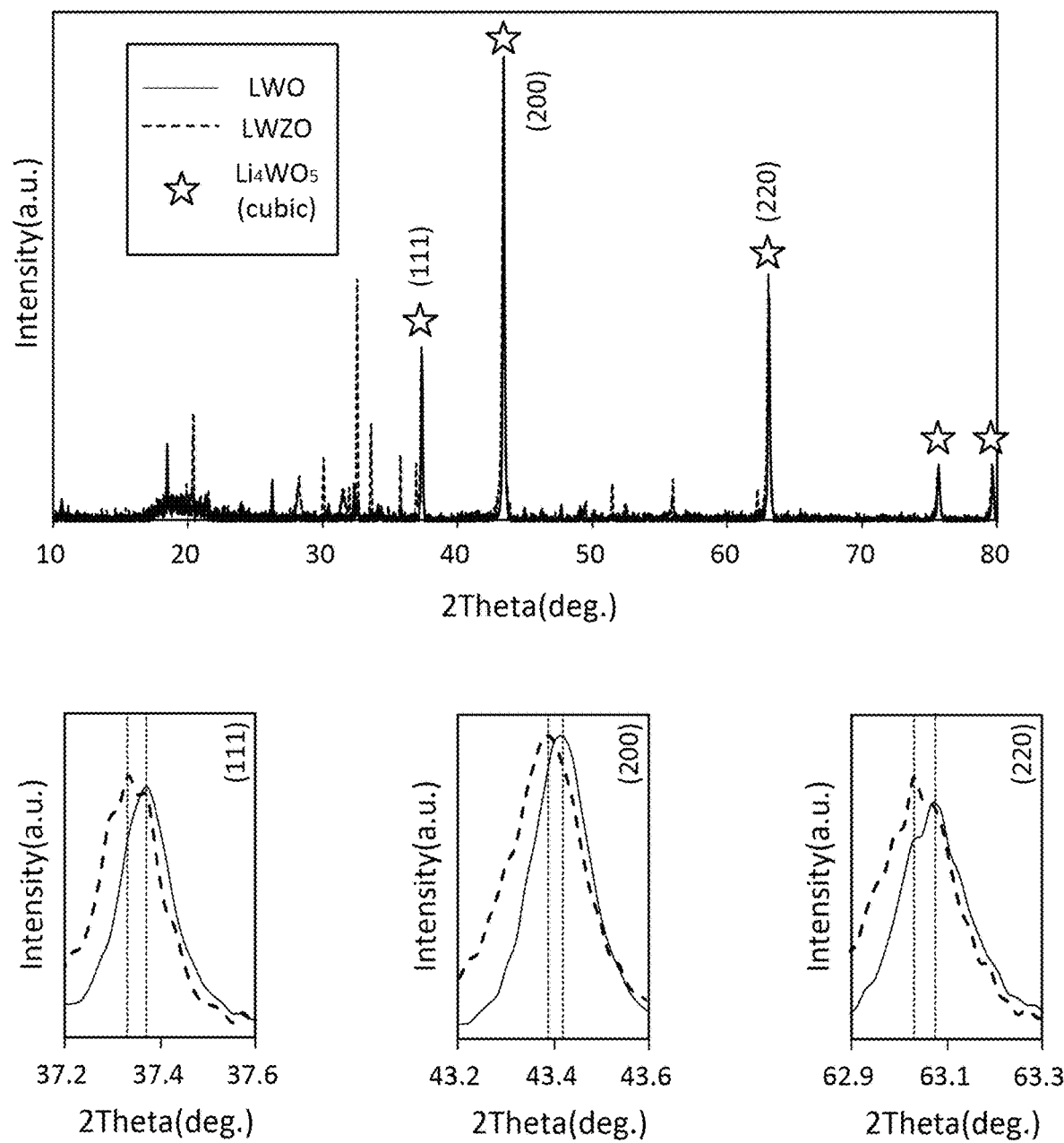
Figure 18:
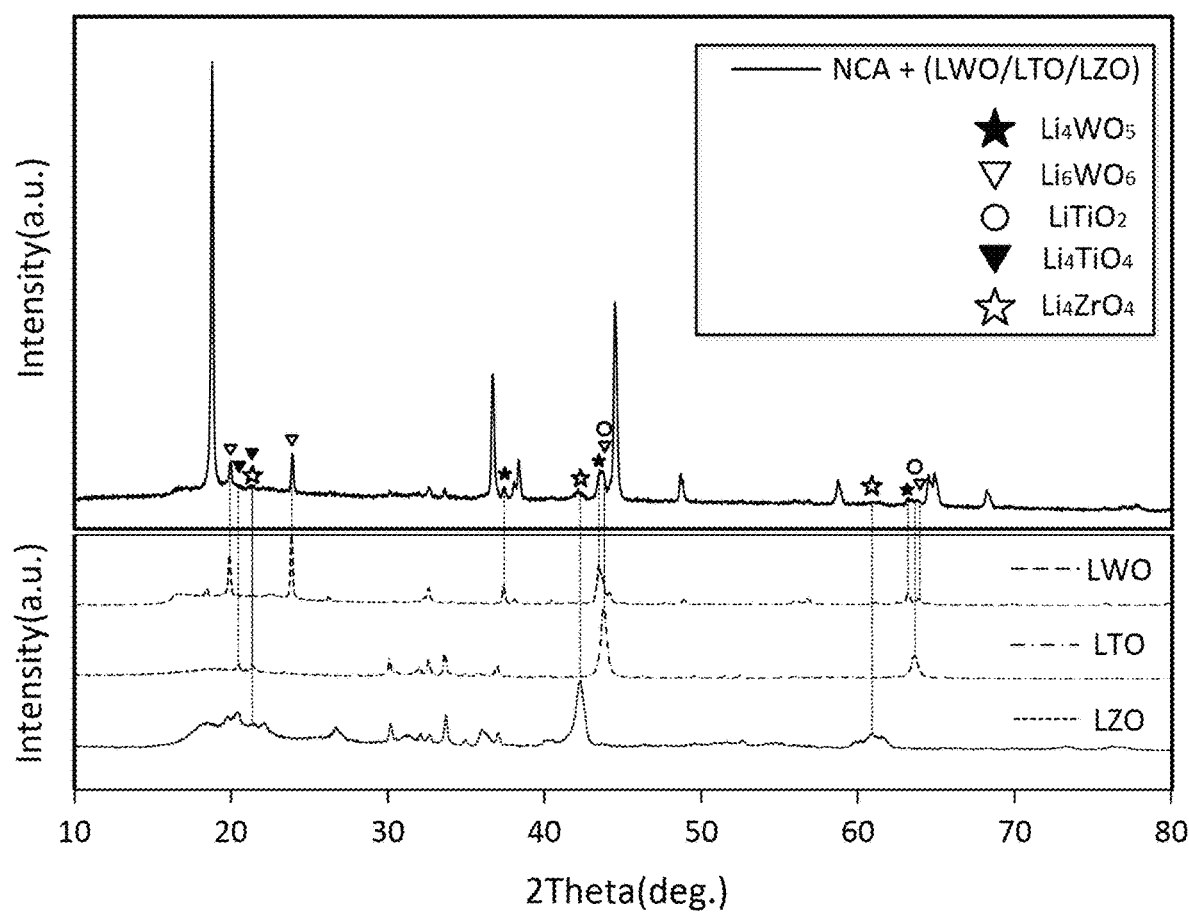

FIGS. 16 to 18 are graphs showing the results of XRD analyses for positive electrode active materials prepared according to Examples 7 to 9.

Referring to FIG. 16, characteristic peaks corresponding to the lithium alloy oxide $Li_4WO_5$ of the positive electrode active materials were confirmed, and particularly, as (220) peak is not shifted, but (111) and (200) peaks are specifically shifted to a low angle, it is confirmed that there is a heterogeneous lithium alloy oxide in which tungsten in the lattice structure of $Li_4WO_5$ is partially substituted with Ti.

In addition, referring to FIG. 17, characteristic peaks corresponding to the lithium alloy oxide $Li_4WO_5$ of the positive electrode active materials were confirmed, and particularly, as (111), (200) and (220) peaks are specifically shifted to a low angle, it is confirmed that there is a heterogeneous lithium alloy oxide in which tungsten in the lattice structure of $Li_4WO_5$ is partially substituted with Zr.

Referring to FIG. 18, it can be confirmed that a positive electrode active material having an NCA composition is formed, and there are peaks corresponding to $Li_4WO_5$, $Li_6WO_6$, $LiTiO_2$, $Li_4TiO_4$ and $Li_4ZrO_4$ in the positive electrode active material.

(4) Measurement of Unreacted Lithium of Positive Electrode Active Material

The measurement of unreacted lithium in each of the positive electrode active materials prepared according to the Examples and Comparative Examples was performed with an amount of 0.1M HCl used until pH 4 by pH titration. First, 5 g of each of the positive electrode active materials prepared according to the Examples and Comparative Examples was added to 100 mL of DIW, stirred for 15 minutes and filtered. 0.1 M HCl was added to 50 mL of the filtered solution, and an amount of HCl consumption according to pH change was measured to determine Q1 and Q2, and thereby, unreacted LiOH and $Li_2CO_3$ were calculated.

$M1 = 23.95$ (LiOH Molecular weight)

$M2 = 73.89$ ($Li_2CO_3$ Molecular weight)

$SPL$ Size = (Sample weight × Solution Weight)/Water Weight

LiOH (wt %) = $[(Q1-Q2) \times C \times M1 \times 100]/(SPL$ Size × 1000)

$Li_2CO_3$ (wt %) = $[2 \times Q2 \times C \times M2/2 \times 100]/(SPL$ Size × 1000)

The measurement results of unreacted lithium obtained by the above equations are shown in Table 3 below.

TABLE 3

| Classification | LiOH (ppm) | $Li_2CO_3$ (ppm) |
|---|---|---|
| Example 1 | 3,943 | 6,257 |
| Example 2 | 3,011 | 5,829 |
| Example 3 | 2,011 | 5,624 |
| Example 4 | 5,306 | 6,982 |
| Example 5 | 5,137 | 7,050 |
| Example 6 | 4,985 | 7,438 |
| Example 7 | 5,573 | 6,781 |
| Example 8 | 4,635 | 6,411 |
| Example 9 | 2,762 | 5,309 |
| Example 10 | 3,718 | 6.129 |
| Comparative Example 1 | 6,758 | 6,428 |
| Comparative Example 2 | 7,100 | 6,324 |
| Comparative Example 3 | 10,590 | 6,894 |
| Comparative Example 4 | 9,892 | 6,357 |

Referring to the results shown in Table 3, it can be confirmed that, in the positive electrode active materials prepared according to the Examples, compared to those of the Comparative Examples, residual lithium amounts are greatly reduced.

Experimental Example 2

(1) Manufacture of Lithium Secondary Battery 94 wt % of each of the positive electrode active materials prepared according to the Examples and Comparative Examples, 3 wt % of carbon black and 3 wt % of a PVDF binder were dispersed in 30 g of N-methyl-2-pyrrolidone (NMP), thereby preparing a positive electrode slurry. The positive electrode slurry was applied and dried on a positive electrode current collector, which is an aluminum (Al) thin film, having a thickness of 15 μm, and subjected to roll pressing, thereby preparing a positive electrode. A loading level of the positive electrode was 10 mg/cm$^2$, and an electrode density was 3.2 g/cm$^3$.

For the positive electrode, a lithium metal was used as a counter electrode, and an electrolyte solution was prepared by adding 1.15M LiPF$_6$ to a solvent in which ethylene carbonate (EC), ethyl methyl carbonate (EMC) and dimethyl carbonate (DMC) were mixed in a volume ratio of 2:4:4.

A lithium secondary battery (coin cell) was manufactured by forming a battery assembly by interposing a separator formed of a porous polyethylene (PE) film between the positive electrode and a negative electrode, and injecting the electrolyte solution thereinto.

(2) Evaluation of Capacity Characteristics of Lithium Secondary Battery

One cycle of charging was performed for the manufactured lithium secondary battery (coin cell) by charging until 4.25 V with a constant current (CC) of 0.15 C at 25° C., charging with a constant voltage (CV) of 4.25 V until a charge current becomes 0.05 mAh. Afterward, a discharge capacity of the lithium secondary battery at the first cycle was measured after being maintained for 20 minutes, and discharging with a constant current of 0.1 C until 3.0 V. The charge capacity, discharge capacity and charge/discharge efficiency in the first charging/discharging are shown in Table 4 below.

TABLE 4

| Classification | Charge capacity (mAh/g) | Discharge capacity (mAh/g) | Charge/discharge efficiency (%) |
|---|---|---|---|
| Example 1 | 234.2 | 208.9 | 89.2% |
| Example 2 | 233.1 | 210.3 | 90.2% |
| Example 3 | 230.1 | 205.0 | 89.1% |
| Example 4 | 233.9 | 211.4 | 90.4% |
| Example 5 | 233.5 | 207.5 | 88.9% |
| Example 6 | 233.9 | 211.6 | 90.5% |
| Example 7 | 233.8 | 211.1 | 90.3% |
| Example 8 | 233.8 | 211.0 | 90.3% |
| Example 9 | 233.7 | 211.5 | 90.5% |
| Example 10 | 233.8 | 211.2 | 90.4% |
| Comparative Example 1 | 233.5 | 204.2 | 87.4% |
| Comparative Example 2 | 233.6 | 204.5 | 87.5% |
| Comparative Example 3 | 233.9 | 203.9 | 87.2% |
| Comparative Example 4 | 233.2 | 204.1 | 87.5% |

Referring to the results of Table 4, it can be confirmed that the lithium secondary batteries using the positive electrode active materials prepared according to the Examples are improved in charge/discharge efficiency and capacity characteristics, compared to the lithium secondary batteries using the positive electrode active materials prepared according to the Comparative Examples.

(3) Evaluation of Stability of Lithium Secondary Battery

The lithium secondary batteries (coin cells) were subjected to 100 cycles of charging/discharging in the range of driving voltage from 3.0 to 4.25 V with a constant current (CC) of 1 C at 25° C. Accordingly, after 100 cycles of charging/discharging at room temperature, cycle capacity retention, which is a ratio of discharge capacity at the 100$^{th}$ cycle to the initial capacity, was measured.

In addition, to confirm the high-temperature storage characteristics of the lithium secondary battery, a resistance was measured by charging the battery charged/discharged at 25° C. on the basis of SOC 100%, and then, after storage at 60° C. for 7 days, a resistance was measured to confirm the variation of the resistance.

The measurement results are shown in Table 5 below.

TABLE 5

| Classification | Capacity retention (%) | Resistance before high-temperature storage (Ω) | Resistance after high-temperature storage (Ω) |
|---|---|---|---|
| Example 1 | 87.4% | 5.1 | 24.7 |
| Example 2 | 92.1% | 4.0 | 14.1 |
| Example 3 | 92.7% | 4.3 | 13.9 |
| Example 4 | 87.8% | 4.3 | 27.5 |
| Example 5 | 88.6% | 4.2 | 33.8 |
| Example 6 | 90.0% | 2.9 | 19.9 |
| Example 7 | 90.1% | 3.0 | 16.8 |
| Example 8 | 91.8% | 3.0 | 11.7 |
| Example 9 | 92.1% | 2.8 | 10.3 |
| Example 10 | 87.3% | 4.9 | 25.0 |
| Comparative Example 1 | 81.5% | 3.1 | 88.8 |
| Comparative Example 2 | 81.8% | 2.2 | 90.0 |
| Comparative Example 3 | 82.7% | 2.5 | 87.4 |
| Comparative Example 4 | 82.4% | 2.8 | 88.9 |

Referring to the results of Table 5, it can be confirmed that the lithium secondary batteries using the positive electrode active materials prepared according to the Examples have excellent capacity retention and a small variation in the resistance before and after high-temperature storage, compared with the lithium secondary batteries using the positive electrode active materials prepared according to the Comparative Examples.

Lithium composite oxides according to various exemplary embodiments of the present invention can improve the structural stability of a lithium alloy oxide due to a concentration gradient of an M2 element included in secondary particles constituting the lithium composite oxide, which decreases toward the center of the secondary particle.

In addition, positive electrode active materials according to various embodiments of the present invention include a lithium alloy oxide existing at least a part of a) the interface between primary particles and b) the surface of secondary particle formed by agglomerating the primary particles, and thus structural stability can be improved. Accordingly, when positive electrodes including the positive electrode active materials according to various embodiments of the present invention are used as those of lithium secondary batteries, high-temperature storage stability and lifespan characteristics can be more improved.

Above, while the examples of the present invention have been described, it will be understood by those of ordinary skill in the art that the present invention may be changed and modified in various ways by addition, alternation, or deletion of components without departing from the spirit of the present invention defined in the appended claims.

What is claimed is:

1. A lithium composite oxide, comprising:
primary particles represented by Formula 1 below and secondary particles formed by agglomerating the primary particles,
wherein an M2 element included in the primary particle present at the surface of the secondary particle exhibits a concentration gradient which decreases toward the center of the secondary particle,
wherein the concentration gradient of the M2 element included in the primary particles be greater at the surface side of the secondary particle than that at the center side of the secondary particle, on the basis of the center of the primary particle,
wherein at least a part of Ni inserted into at least one selected from Li 3a and 3b sites of atom-occupied sites in the lattice structure of the lithium composite oxide is substituted with the M2 element:

$$Li_aNi_{1-(b+c+d)}Co_bM1_cM2_dO_2, \quad \text{[Formula 1]}$$

wherein,
M1 is at least one selected from Mn and Al, M2 is at least one selected from Ti, Zr, Mg, V, B, Mo, Zn, Nb, Ba, Ta, Fe, Cr, Sn, Hf, Ce, W, Nd and Gd, $0.5 \leq a \leq 1.5$, $0.01 \leq b \leq 0.50$, $0.01 \leq c \leq 0.20$, and $0.001 \leq d \leq 0.20$.

2. The lithium composite oxide of claim 1, wherein at least a part of Ni inserted into at least one selected from Li 3a and 3b sites of atom-occupied sites in the lattice structure of the lithium composite oxide is substituted with the M2 element in the primary particles at the surface of the lithium composite oxide.

3. The lithium composite oxide of claim 2, wherein the surface of the lithium composite oxide is the region from the outermost surface to 0.05 μm in the secondary particle.

4. The lithium composite oxide of claim 1, wherein the occupancy of Ni inserted into Li 3a sites of primary particles present at the surface of the lithium composite oxide is 1.35% or less.

5. The lithium composite oxide of claim 1, wherein a interplanar distance of a (003) crystal plane of the primary particles present at the surface of the lithium composite oxide is 4.7293 Å or more.

6. A positive electrode active material for a lithium secondary battery, comprising:
the lithium composite oxide according to claim 1; and
a lithium alloy oxide existing at least a part of a) the interface between primary particles and b) the surface of secondary particles.

7. The positive electrode active material of claim 6, wherein the lithium alloy oxide exhibits a concentration gradient which decreases from the surface to the center of the secondary particle.

8. The positive electrode active material of claim 6, wherein the lithium alloy oxide is represented by Formula 2 below:

$$Li_eM3_fO_g, \quad \text{[Formula 2]}$$

wherein,
M3 is at least one selected from Ti, Zr, Mg, V, B, Mo, Zn, Nb, Ba, Ca, Ta, Fe, Cr, Sn, Hf, Ce, W, Nd and Gd, $0 \leq e \leq 6$, $0 < f \leq 6$, and $0 < g \leq 10$.

9. A lithium secondary battery comprising a positive electrode including the positive electrode active material of claim 6.

* * * * *